July 29, 1924.
W. DAVIS
POWER TRANSMITTER
Filed Nov. 15, 1922    2 Sheets-Sheet 1
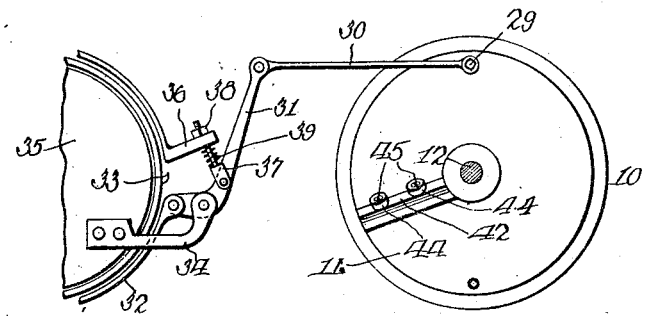
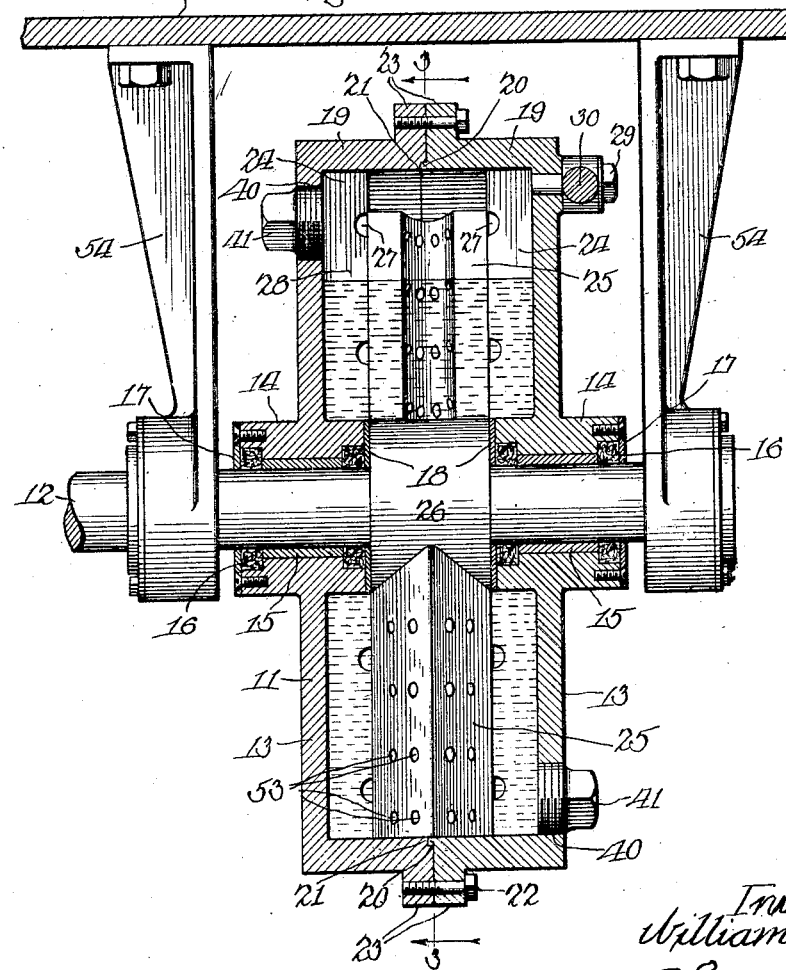
Inventor:
William Davis
By Chas. Tideman
Atty.

July 29, 1924.  
W. DAVIS  
POWER TRANSMITTER  
Filed Nov. 15, 1922
1,502,767
2 Sheets-Sheet 2
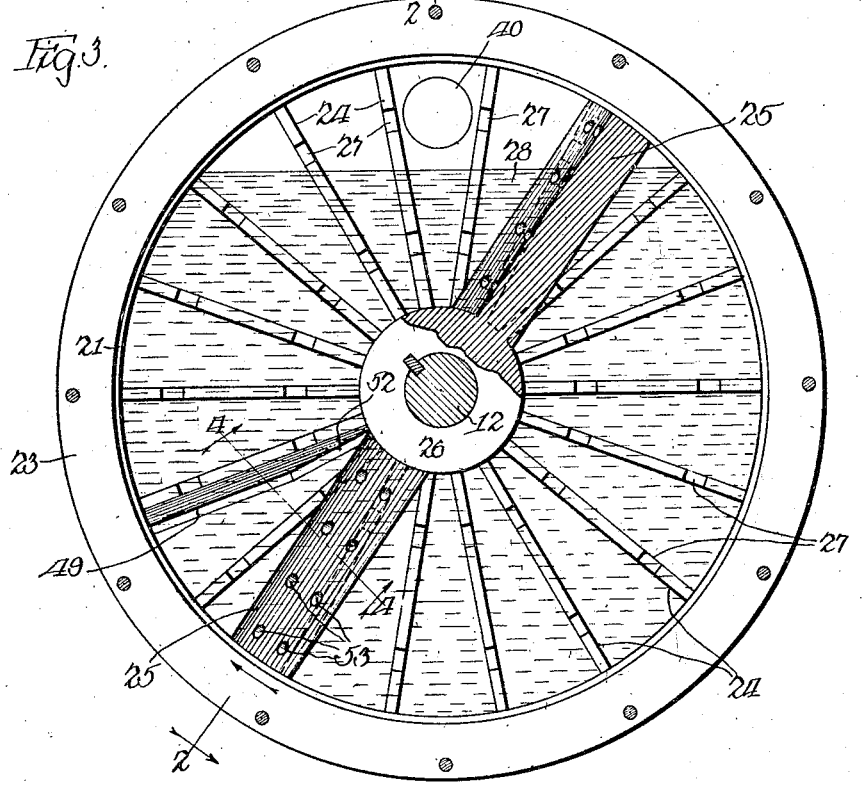
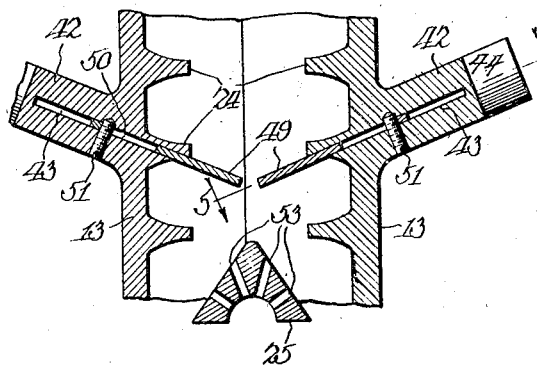
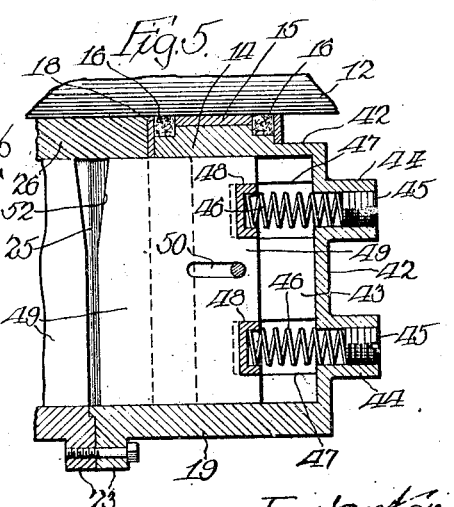
Inventor:
William Davis
By Chas. C. Tillman
Atty.

Patented July 29, 1924.

1,502,767

UNITED STATES PATENT OFFICE.

WILLIAM DAVIS, OF CHICAGO, ILLINOIS.

POWER TRANSMITTER.

Application filed November 15, 1922. Serial No. 601,028.

*To all whom it may concern:*

Be it known that I, WILLIAM DAVIS, a citizen of the United States, residing at Chicago, in the county of Cook and State of Illinois, have invented certain new and useful Improvements in Power Transmitters, of which the following is a specification.

The present invention embodies, to a certain extent, the structural principle and features of the resistance device disclosed and claimed in Letters Patent Number 1,449,499, issued to me on the 27th day of March, 1923, for improvements in electrically operated brake mechanism for automobiles, and is for improvements over said device.

While the present invention, like the device above referred to, is primarily intended for use in connection with a brake mechanism for automobiles, and is so shown and will be hereinafter so described, yet, I desire it to be understood that I do not wish to be limited in its application to any specific kind of mechanism, but may employ it wherever it may be found applicable for use, without departing from the spirit of the invention.

The principal object of the invention is to provide in a line of power transmission from a prime mover, such as an electric motor, to the frictional brake band of a brake mechanism, or its equivalent, yieldingly resisting means to co-operate with parts driven by the motor in such a manner as to cause the brake band to be applied to the drum with which it co-acts, with sufficient frictional stress or clamping action to stop the automobile without stopping the driven shaft.

The invention contemplates as a still further object, means for automatically releasing or relieving the brake of stress or clamping action as soon as the motor of the mechanism is de-energized or the prime mover is stopped.

A further and very important object of the present invention, is to so construct and arrange the parts of the device that it may be made into a more compact form than that of the device disclosed in my aforesaid application, and also so that a less amount of semi-fluid material may be employed than is required in the structure of my aforesaid application, without diminishing the yieldingly resisting power of the device.

Other objects and advantages of the invention will be disclosed in the following description and explanation.

In the accompanying drawings, which serve to illustrate an embodiment of the invention,—

Figure 1 is a view in side elevation of the variable resistance, showing it connected to a fragment of the brake mechanism for automobiles.

Fig. 2 is an enlarged vertical sectional view taken on line 2—2 of Fig. 3 looking in the direction indicated by the arrows, showing the container of the variable resistance mounted on and depending from a portion of a horizontal support such as a portion of the floor of an automobile body.

Fig. 3 is a view partly in elevation and partly in section taken on line 3—3 of Fig. 2 as indicated by the arrows.

Fig. 4 is a fragmental sectional view taken on line 4—4 of Fig. 3 looking in the direction indicated by the arrows, and Fig. 5 is a similar but enlarged view taken on line 5—5 of Fig. 4.

Corresponding numerals of reference refer to like parts throughout the different views of the drawings.

In the drawings I have illustrated the resistance device mounted on a shaft which may be driven by a motor, not shown, and a portion of the brake drum and band therefor of an automobile, the said band being connected to the resistance device for operation thereby, it being deemed that such illustration, together with the accompanying explanation, is sufficient for a full and clear understanding of the mechanism.

Referring now more particularly to Fig. 1 of the drawings, the resistance device is designated as a whole by the reference numeral 10, and comprises a container 11 which is for the reception and retention of a quantity of semi-fluid composition as well as for the reception and operation of rotary means for contacting and co-acting with said composition within the container for producing a yielding resistance to said rotary means, and to the rotation of the shaft 12 which actuates the brake band of the mechanism. It will be seen and understood by reference to Fig. 2, that the container consists of a pair of substantially cup-shaped members 13, each provided with a centrally disposed hub 14 having a centrally located opening for the reception of the shaft 12, on which the container is mounted for independent oscillating or rotary movement but against longitudinal movement on said shaft.

Each of the openings in the hubs 14 is provided with a bushing 15 of any suitable kind of metal, which surround the shaft 12 as shown. At each end of each of the bushings 15 the opening in each of the hubs 14 is annularly enlarged and provided with suitable packing 16 which is held in place by means of orificed plates 17 secured to the outer end of each hub and by means of similar plates or washers 18 located on the inner end of each hub and around the driven shaft. Each of the members 13 of the container has at its periphery an inwardly extended annular flange 19 and one of said flanges has at its edge adjacent the other flange a rib 20 to fit in a circular groove 21 in the adjacent edge of the other flange so as to provide a tight joint. These members are secured together by means of bolts 22 extended through transversely disposed openings in the ribs 23 with which each of the flanges 19 is provided at their meeting edges.

Each of the members 13 is provided on its inner surface with a plurality of webs 24 which extend radially from that portion of the hubs of said members which is located within their cavities. These inwardly extended portions of the hubs 14 are spaced from each other as is shown in Fig. 2, and the adjacent edges of the webs or ribs 24 are located about flush with the inner surface of said parts of the hubs so as to permit of movement between the adjacent edges of the webs 24 of paddles or blades 25 which are rigidly mounted at their inner portions on a hub 26 located between the adjacent inner portions of the hubs 14 on the shaft 12 and keyed to said shaft. The outer ends of the blades or paddles 25 extend to the inner surface of the flanges 19 of the container.

These blades, as shown, are substantially V-shaped in cross-section and present their apexes in the same direction, that is, in the direction in which the shaft 12 and the wheel 26 which carry said blades, rotate. The webs 24 of one of the members 13 preferably register or co-incide with the webs of the other member 13 of the container, and each of said webs has in its free edge a plurality of small recesses or notches 27, thus forming ports through which portions of the semi-fluid composition 28 will be forced in the rotation of the said blades or paddles. Pivotally connected at one of its ends to a suitable projection 29 on one side of the container 11 and near the periphery thereof, is one end of a rod 30, the other end of which is pivotally connected to the free end of the arm 31 of a bell crank lever which actuates the brake band 32, which band surrounds the brake drum 33 of the automobile.

As shown in Fig. 1, the said bell crank lever is fulcrumed on a bracket 34 carried by a non-rotatable part 35 of the automobile, and the shorter arm of said lever is pivotally connected to one end of the brake band 32, the other end of which is provided with an outwardly extended apertured foot 36, which foot is pivotally connected to the longer arm 31 of the bell crank lever by means of a screw bolt or rod 37 extended through the opening in the foot 36 and a nut 38 on the outer end of said rod.

Interposed between the foot 36 and the pivot of the rod 37, is a spring 39 which is coiled around said rod. By this arrangement it is apparent that the ends of the brake band 32, which is of the split type, may be adjusted with respect to each other by simply turning the nut 38 in the proper direction on the rod 37.

Referring again to the construction of the container, the matter or composition 28 used therein consists of a mixture of light fibre-grease, kerosene, and glycerine, and is of semi-fluid character and of such nature as to be non-liquefiable and non-freezable, or non-solidifying; or, in other words, is of such character as to maintain a semi-fluid nature under all circumstances. The container 10 is only partially filled with said material, which can be supplied to the container or withdrawn therefrom through openings 40 in the sides of the container near its periphery, which openings may be closed by means of screw-plugs 41 seated therein. However, it will be understood that as the quantity of the material within the container is increased, the resistance offered by said material to the rotary blades or paddles 25, will be correspondingly increased, or if the quantity is diminished, the resistance against said members will be diminished.

Thus far, the description of the construction of the resistance device comprising the container 11, the rotary blades 25 and the semi-fluid material 28, is substantially the same as that of the resistance device shown and described in my aforesaid patent.

The present invention, however, embodies in addition to the above described features, means for increasing the variable resistance within the container and permitting said container to be made more compact in form or much smaller than my former device. To accomplish this result, each of the members 13 of the container is provided on its outer surface with a radially disposed elongated boss or enlargement 42, each of which is provided with a longitudinally extended narrow slot 43, which slots are inclined with respect to the walls of the members 13 as well as with respect to the webs 24 through which they are extended, all of which is clearly shown in Fig. 4 of the drawings. The bosses or enlargements 42 are located opposite each other as shown, and their slots are inclined inwardly towards each other and extend from the inner portions of the hubs 14 of the members 13 to near the inner surface of the flanges 19 of said members.

Each of the bosses or enlargements 42 is provided on its outer surface with a plurality of tubular extensions 44 which are internally screw-threaded at their outer portions to engage screw plugs 45 employed for regulating the tension of the springs 46 one of which is located in each of said extensions and extended through enlargements 47 of the slots 43 and each rests at its inner end against a cup-shaped member 48 as shown in Fig. 5 of the drawings. Slidably located in each of the slots 43 of each of the enlargements 42 is a sliding valve 49 the outer edge of each of which is fitted or fixed to the members 48, which members are of a size to operate freely in the enlarged portions 47 of the slots 43, which enlarged portions act as guides for said members. Each of the sliding valves 49 is provided with a transversely disposed slot 50 for the reception of a screw or stop pin 51, with which each of the enlargements 42 is provided. These screws or stop pins are employed to prevent the displacement of the sliding valves yet to permit of their free movement towards and from each other. The inner edge of each of the valves 49 adjacent the paddle wheel or hub 26, is slightly inclined as at 52, see Fig. 5, towards said wheel, so that in the revolution of the paddles 25, which present their apexes towards the inner edges of the valves 49, the inner portions of said paddles, or rather that portion thereof adjacent the wheel 26, will first contact with the inclined portions 52 of the valves 49, thus depressing said valves outwardly so as to permit one of the paddles at a time to pass between the inner edges of the valves 49 and in contact therewith, in which operation it is apparent that the valves will be moved outwardly until their inner edges are about flush with the edges of the webs 24 of the members 13 of the container. As soon as one of the paddles 25 in the rotation of the shaft 12, has passed between the valves 49, it is manifest that the springs 46 exerting their tension against the outer edges of the valves, will force the latter inwardly to about the positions shown in Fig. 4, in which positions they will remain until they are again actuated outwardly by the other paddle or blade of the wheel 26 which rotates with the driven shaft. As these valves normally are extended into the path of the paddles with their adjacent edges closely approximated, it is evident that they will afford baffling resistance to the semi-fluid composition pressed there-against by the action of the paddles. This resistance created by the valves in addition to that created by the baffling webs 24, enables a much smaller container to be employed than if the valves were not used.

Each of the blades or paddles 25 is substantially V-shaped in cross-section and is provided with a series of ports 53 on each of its sides to permit of the passage of quantities of the semi-fluid composition in the operation of the device.

The resistance device is shown in Fig. 2 as being mounted on a shaft 12 supported by depending hangers 54 secured at their upper ends to a horizontal support 55 such as the body or frame of an automobile. This shaft may be driven by any suitable means but usually by means of an electric motor (not shown) geared thereto in any suitable manner.

From the foregoing and by reference to the drawings, it will be understood that in the rotary movement of the shaft 12, and the paddles or blades 25, the latter will meet with the resistance offered by the material or composition 28, which by reason of its semi-fluid nature and by reason of its being forced through the ports 27 of the baffling webs 24 and through the ports 53 of the paddles, offer yielding resistance. This resistance will be sufficient to cause the container 11 to be oscillated or rotated in the proper direction to force through its connections 30 and 31 with the brake band 32, the members of said band against the drum with great pressure or sufficient pressure to stop the automobile.

In the foregoing operation it will be understood that the driven shaft 12 will not be stopped, and thus the danger of burning out the motor, when said shaft is operated by an electric motor, or injury to the same, will be avoided. As the container is independently rotatable on the shaft 12 while the wheel 26 and its paddles 25 are mounted to turn with said shaft, it is obvious that the composition or material 28 within the container will be compressed by the action of the blades against said composition, and that as soon as the movement of the driven shaft 12 is stopped, the resiliency or re-action of the compression of the composition 28 will be exerted against the webs and valves of the container sufficiently to cause said container to oscillate or move in the opposite direction from which it has previously been turned and thus through the connections with the brake band automatically release said band or the pressure thereof from the brake drum.

It will be observed by reference to Fig. 3 of the drawing that the front edges or apexes of the paddles 25 are located tangentially with respect to the axis of the shaft 12 on which it is mounted, while the baffling webs 24 are located radially with respect to the axis of said shaft. By this arrangement it is manifest that the front portions of the paddles 25 adjacent the wheel or hub 26, will, in the revolution of said wheel, contact with the inclined portions 52 of the valves 49 in such a way as to slide along the inner edges of said valves, thus causing them to be outwardly depressed. By this arrangement it is evident that danger of the valves locking the paddles is prevented.

Having thus fully described my invention, what I claim as new and desire to secure by Letters Patent is—

1. In a mechanism of the class described, the combination with a driven shaft, of a wheel mounted on said shaft to rotate therewith, a plurality of paddles fixed to said wheel and extended therefrom, a container surrounding said wheel and its paddles and mounted on said shaft for independent oscillatory movement, said container having on at least one side of the paddle wheel within its cavity a plurality of radially disposed webs, a spring actuated sliding valve mounted on one of the walls of the container for inward and outward movement with respect thereto for co-operation with said paddles, and semi-fluid material partially filling said container.

2. In a mechanism of the class described, the combination with a driven shaft, of a wheel mounted on said shaft to rotate therewith, a plurality of paddles fixed to said wheel and extended therefrom, a container surrounding said wheel and its paddles and mounted on said shaft for independent oscillatory movement, said container having on each side of the paddle wheel within its cavity a plurality of radially disposed webs, a spring actuated sliding valve mounted on each of the side walls of the container for inward and outward movement with respect thereto for co-operation with said paddles, and semi-fluid material partially filling said container.

3. In a mechanism of the class described, the combination with a driven shaft, of a wheel mounted on said shaft to rotate therewith, a plurality of paddles provided with ports fixed to said wheel and extended therefrom, a container surrounding said wheel and its paddles and mounted on said shaft for independent oscillatory movement, said container having on each side of the paddle wheel within its cavity a plurality of radially disposed webs, a spring actuated valve radially mounted on each of the side walls of the container in opposed positions for inward and outward movement with respect thereto for co-operation with said paddles, and semi-fluid material partially filling said container.

4. In a mechanism of the class described, the combination with a driven shaft, of a wheel mounted on said shaft to rotate therewith, a plurality of paddles fixed to said wheel and extended therefrom, a container surrounding said wheel and its paddles and mounted on said shaft for independent oscillatory movement, said container having on each side of the paddle wheel within its cavity a plurality of radially disposed webs provided with ports, a spring actuated sliding valve mounted on each of the side walls of the container in opposed positions for inward and outward movement with respect thereto for co-operation with said paddles, and semi-fluid material partially filling said container.

5. In a mechanism of the class described, the combination with a driven shaft, of a wheel mounted on said shaft to rotate therewith, a plurality of paddles provided with ports fixed to said wheel and extended therefrom with their front edges disposed tangentially with respect to the periphery of said shaft, a container surrounding said wheel and its paddles and mounted on said shaft for independent oscillatory movement, said container having on each side of the paddle wheel within its cavity a plurality of radially disposed webs provided with ports, a spring actuated sliding valve mounted on each of the side walls of the container in opposed positions for inward and outward movement with respect thereto for co-operation with the said paddles, and semi-fluid material partially filling said container.

WILLIAM DAVIS.